US000001301H

United States Statutory Invention Registration [19]

[11] Reg. Number: H1301

Lee et al.

[43] Published: Apr. 5, 1994

[54] METHOD FOR CONTROLLING POLYMER SHRINKAGE

[75] Inventors: Robert W. Lee; Cesar O. Castro; Jennifer L. Engle, all of Houston, Tex.

[73] Assignee: Shell Oil Company, Houston, Tex.

[21] Appl. No.: 875,498

[22] Filed: Apr. 29, 1992

[51] Int. Cl.[5] ..... C08K 5/15

[52] U.S. Cl. ..... 524/108; 524/387

[58] Field of Search ..... 524/387, 108

[56] References Cited

U.S. PATENT DOCUMENTS

| | | |
|---|---|---|
| 3,733,373 | 5/1973 | McConnell et al. . |
| 4,283,502 | 8/1981 | Richardson . |
| 4,320,209 | 3/1982 | Chatterjee . |
| 4,321,334 | 3/1982 | Chatterjee . |
| 4,322,503 | 3/1982 | Chatterjee . |
| 4,359,544 | 11/1982 | Hwo et al. . |
| 4,554,321 | 11/1985 | Hwo et al. . |
| 4,886,849 | 12/1989 | Hwo et al. . |
| 4,948,823 | 8/1990 | Wallach . |
| 5,030,682 | 7/1991 | Nomura et al. . |

FOREIGN PATENT DOCUMENTS 57036140 8/1980 Japan .

OTHER PUBLICATIONS

Poly(Ethylene Naphthalenedicarboxylate) Polymers Containing Crystallization Promoters, Research Disclosure No. 294,090.

Advanced Nucleating Agent For Clarifying Polyolefins, Plastics Compounding, Jul./Aug. 1990.

A Nucleating Agent For Crystalline Olefinic Polymers, Modern Plastics, Sep. 1984.

*Primary Examiner*—Robert L. Stoll
*Assistant Examiner*—Joseph D. Anthony

[57] ABSTRACT

It is herein disclosed a method for controlling the shrinkage of parts formed from semi-crystalline polyolefin involving the addition of a suitable nucleant(s), in a suitable amount. This method results in reduced processing costs primarily due to reduced processing cycle time and to greater flexibility in the use of processing equipment.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR CONTROLLING POLYMER SHRINKAGE

FIELD OF THE INVENTION

This invention generally relates to polyolefins. In particular, this invention relates to a method of controlling the amount (and rate) of shrink that polyolefin undergoes during processing.

BACKGROUND OF THE INVENTION

Polyolefin compositions and various processes for making these compositions are known in the art. However, because of the unique characteristics of various polyolefin compositions, and the unique applications for which these polyolefins are variably suitable, interest in these materials remains a constant concern of the plastics industry and its numerous customers.

It is known in the art that polyolefins can be nucleated to improve its optical and other properties. There is some teaching in the art about the mechanism of nucleation, the selectivity of nucleants, and on the effects of nucleating. While it is generally known that nucleation does affect the rate and amount of shrink that polyolefins undergo, it is not known how these effects can be either pre-determined or controlled. The availability of such knowledge will be beneficial to polyolefin processors because it will enable them to customize their finished products. This in turn will result in improved processing efficiency, including reduced processing cost

SUMMARY OF THE INVENTION

This invention provides a method for controlling the shrinkage of nucleated semi-crystalline polyolefins involving the addition of nucleant(s) in an amount of from 0.0001 to 5 weight percent of the nucleated semi-crystalline polyolefin. This enables control of the crystallization temperature (Tc) and crystallization rate (Tr).

The benefits of this invention include but are not limited to cost reduction due to an increase in the production rate resulting from a reduction in processing cycle time; and that it permits processors to tailor their processes in order to meet the specific parts requirements of their various customers This flexibility in processing conditions avoids or minimizes the need to purchase additional equipment.

DETAILED DESCRIPTION OF THE INVENTION

In very generalized terms, the practice of this invention involves adding a suitable amount of nucleant(s) to a semi-crystalline polyolefin prior to processing to form finished parts. This results in or enables the shrinkage of the polyolefin to be controlled, an outcome that is sometimes referred to as controlled shrinkage.

By the term "controlled shrinkage" is meant the ability to control the dimensions of the final product produced from nucleated polyolefins. This depends in part on the effectiveness of nucleation, which is in turn dependent on both the type and amount of nucleant(s). These factors result in changes in the shrink rate, and in the final amount of shrink experienced by the nucleated polyolefin.

Generally speaking, all semi-crystalline polyolefins are suitable in the practice of this invention. These polyolefins are exemplified by polyethylene, polypropylene, polybutylene, polyisoprene, and their copolymers. Preferred among these polyolefins is polybutene-1.

The preferred polybutene-1 can be isotactic, elastomeric, syndiotactic, or it can have any characteristic that is known or expected of polybutene-1 polymers Particularly preferred is isotactic polybutene-1 polymer. These polybutene-1 polymers including their methods of preparation, and their properties are very well known in the art. The interested reader is directed to exemplary references such as U.S. Pat. Nos. 4,645,792 and 4,886,849.

Still generally speaking, all nucleating agents that are capable of nucleating the polyolefin polymers are useful in the practice of this invention. Such a nucleating agent(s) generally has one or more of the following properties; a higher melting point than the polyolefins; good melt stability, i.e. with minimal or no crosslinking or degradation upon melting; insolubility in polyolefins; and a chemical structure that contains both polar and non-polar groups, is non-reactive with polyolefin; and does not volatilize during melt processing.

Suitable nucleants can be broadly classified into organic and inorganic compounds. Organic nucleants include sorbitol, carbon black, metallic salts of organic acids, such as calcium stearate, zinc stearate, sodium benzoate, lithium benzoate, amides, and other polyolefins. The organic nucleants generally work better and are preferred.

Useful inorganic nucleants include talc, zinc oxide, titanium oxides, aluminum silicate, and clay.

The nucleant(s) are present in the nucleated polyolefin in an amount within the range of from 0.0001 to 5 weight percent. However, an amount of from about 0.1 to 1 weight percent is preferred.

Although the organic nucleants are preferred, the operability of this invention is independent of the particular nucleant(s) used. To be redundant, all suitable nucleants are appropriate for use.

Conventional additives such as oxidative, thermal, or U.V. stabilizers, lubricants and mold release agents, and combustion inhibitors may be added to the nucleated polyolefin composition. The particular additive to be added, the amount to be added, and when to be added, are discretionary options that can competently be exercised by a skilled artisan.

PROCESS

The process of practicing this invention involves forming a mixture of a semi-crystalline polyolefins with a premeasured amount of a nucleant(s), and then dry blending the mixture in a suitable device, such as a tumbler. Following this, the mixture is melt compounded in any suitable melt device, such as an extruder or a Brabender mixer, operating at a temperature of about 110°-500° C., preferably 130°-250°. A die is attached to the melting device, and the molten material pushes through the die to form a part The die used depends on the type of part desired to be formed The parts are formed using conventional methods such as injection molding, blow molding, and pipe/-sheet extrusion. Typically, these parts are formed as the molten material cools The dimension of the formed part are measured after solidification. These dimensions are measured at intervals until no change is observed At this point, the ultimate dimension of the formed part (L, W, or H) is known. This ultimate dimension, is controlled by the amount of pre-added nucleant(s).

Without wishing to be bound by theory, it is believed that the amount and type of nucleant(s) utilized, influences the crystallization temperature and rate. This in turn permits controlling the shrinkage rate and amount of the formed part(s), which can be determined by the final dimensions of the formed part(s).

The invention is further illustrated by the following non-limiting examples.

EXAMPLE 1

60 grams of isotactic polybutylene was blended with each of the nucleation packages outlined in Table 1. All samples were mixed on a batch-type Brabender mixer under nitrogen at 190° C. for 10 minutes at 100 rpm rotation speed.

TABLE 1

| FORMULATION | NUCLEATION PACKAGE USED | WT. % |
|---|---|---|
| 1 | HDPE, talc, titanium dioxide | 2.95 |
| 2 | HDPE, talc, titanium dioxide, calcium stearate | 2.95 |
| 3 | HDPE, titanium dioxide, calcium stearate | 0.50 |

EXAMPLE 2

One hundred pounds of each of the formulations described in Example 1 was melted in a single screw extruder at 215° C. and passed through an annulus die at 225° C. Subsequent to passing through the die, a parison was formed which was blow molded to the final part, a large capacity (>50 gal.) water heater tank. Shrinkage was measured along the maximum length of the tank. The thermal properties of the three formulations were also measured. These results are shown in Table 2.

TABLE 2

| FORMULATION | CRYST. TEMP. | CRYST. ½ TIME @ 95° C. | SHRINKAGE (inch/inch) | TIME TO REACH 95% OF SHRINKAGE |
|---|---|---|---|---|
| 1 | 75° C. | 26 minutes | 0.024 | 6.6 days |
| 2 | 83° C. | 6 minutes | 0.026 | 4.0 days |
| 3 | 88° C. | 2 minutes | 0.029 | 3.0 days |

Formulation 2 has improved nucleation over Formulation 1 because of the addition of calcium stearate, an organic nucleant. Formulation 3 achieves even greater nucleation because of the removal of talc, a less effective inorganic nucleant. These formulations contain a nucleating package that is within the inventive range, and all formulations illustrate the controlled shrinkage that is desired by the practice of this invention.

While this invention has been described in detail for the purpose of illustration, it is not to be construed as limited thereby but is intended to cover all changes and modifications within the spirit and scope thereof.

What is claimed is:

1. A method for controlling the shrinkage of parts formed from nucleated semi-crystalline polyolefins comprising adding from about 0.0001 to 5 weight percent of at least one nucleant to said semicrystalline polyolefin during processing.

2. A method as in claim 1 wherein said nucleant is present in an amount of from 0.1 to 1 wt. %.

3. A method for controlling the shrinkage of parts formed from nucleated polybutene-1 comprising adding from about 0.0001 to 5 weight percent of one or more nucleant to said semi-crystalline polyolefin during processing.

4. A method as in claim 3 wherein said nucleant is present in an amount of from 0.1 to 1 wt. %.

5. A method as in claim 4 wherein said polybutene is isotactic polybutene.

6. A method as in claim 3 wherein said nucleant is an organic nucleant.

* * * * *